United States Patent
Aubonnet et al.

(10) Patent No.: US 9,849,313 B2
(45) Date of Patent: Dec. 26, 2017

(54) SYSTEM TO DELIVER OXYGEN IN AN AIRCRAFT

(75) Inventors: Severine Aubonnet, Fontenay-le-Fleury (FR); Henri Marotte, Itteville (FR)

(73) Assignee: Zodiac Aerotechnics, Plaisir (FR)

( * ) Notice: Subject to any disclaimer, the term of this patent is extended or adjusted under 35 U.S.C. 154(b) by 932 days.

(21) Appl. No.: 12/297,875

(22) PCT Filed: Apr. 26, 2006

(86) PCT No.: PCT/EP2006/004949
§ 371 (c)(1),
(2), (4) Date: Jan. 23, 2009

(87) PCT Pub. No.: WO2007/121773
PCT Pub. Date: Nov. 1, 2007

(65) Prior Publication Data
US 2009/0165796 A1    Jul. 2, 2009

(51) Int. Cl.
*A62B 7/12*    (2006.01)
*A62B 7/14*    (2006.01)
*B64D 10/00*   (2006.01)

(52) U.S. Cl.
CPC .......... *A62B 7/14* (2013.01); *A62B 7/12* (2013.01); *B64D 10/00* (2013.01)

(58) Field of Classification Search
CPC .... A62B 7/00; A62B 7/12; A62B 7/14; A62B 17/008; A62B 18/00; A62B 18/02; B64D 10/00
USPC ........... 128/204.18, 204.21, 204.22, 204.26, 128/204.29, 205.11
See application file for complete search history.

(56) References Cited

U.S. PATENT DOCUMENTS

| | | | | |
|---|---|---|---|---|
| 2,929,377 A | * | 3/1960 | Cummins | 128/204.25 |
| 3,183,917 A | | 5/1965 | Henneman | |
| 3,474,812 A | * | 10/1969 | Robertson | 137/81.1 |
| 3,675,649 A | * | 7/1972 | Basham et al. | 128/204.22 |
| 4,282,870 A | * | 8/1981 | Porlier | 128/203.14 |
| 4,335,735 A | | 6/1982 | Cramer et al. | |
| 4,336,590 A | * | 6/1982 | Jacq et al. | 128/204.21 |
| 4,648,397 A | * | 3/1987 | Beale | 128/205.11 |
| 5,022,393 A | * | 6/1991 | McGrady et al. | 128/205.23 |
| 5,357,949 A | * | 10/1994 | Bertheau et al. | 128/204.29 |

(Continued)

FOREIGN PATENT DOCUMENTS

JP    4-138174    5/1992

OTHER PUBLICATIONS

Federal Aviation Requirements (FAR) §91.211(b)(1)(ii) on pp. 212-213 of the 2004 FAR publication.*

*Primary Examiner* — Kathryn E Ditmer
(74) *Attorney, Agent, or Firm* — Kilpatrick Townsend & Stockton LLP; Dean W. Russell

(57) ABSTRACT

The invention relates to a system to deliver a respiratory gas to crew members in a cabin of an aircraft. The system includes at least one respiratory mask, an ambient air inlet for admission of ambient air into the respiratory mask, a source of additional gas, supply lines to transport the additional gas to the respiratory mask, a mixing chamber provided on the supply lines to mix the additional gas with ambient air to supply a respiratory gas corresponding to a mixture of the additional gas and the ambient air to the respiratory mask, regulation system to regulate the additional gas content of the respiratory gas at least partly as a function of the aircraft altitude.

6 Claims, 2 Drawing Sheets

(56) References Cited

U.S. PATENT DOCUMENTS

| | | | | |
|---|---|---|---|---|
| 5,460,175 A | * | 10/1995 | Foote et al. | 128/205.24 |
| 2004/0099265 A1 | * | 5/2004 | Bardel et al. | 128/201.22 |
| 2007/0089746 A1 | * | 4/2007 | Mitchell | A62B 99/00 |
| | | | | 128/205.15 |

* cited by examiner

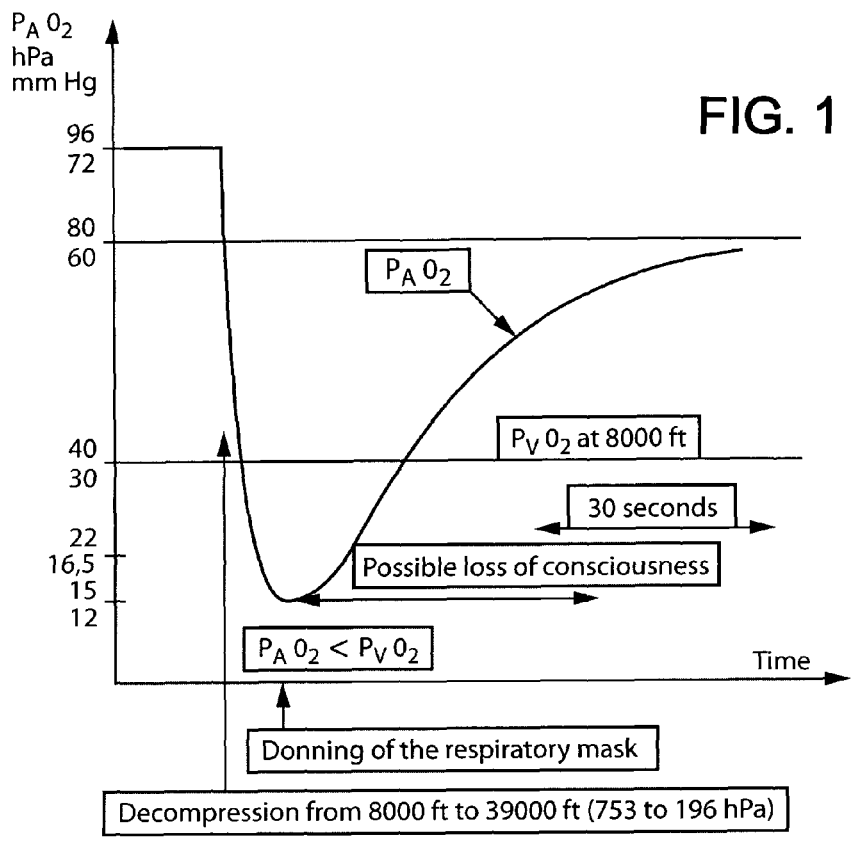
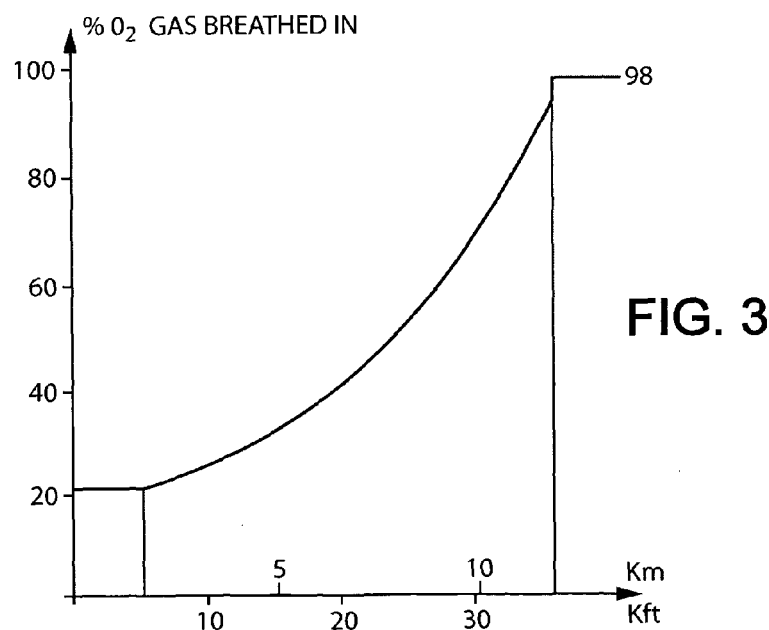

SYSTEM TO DELIVER OXYGEN IN AN AIRCRAFT

This invention relates to systems to deliver a breathable or respiratory gas in an aircraft to passengers and crew members, and more specifically to a system adapted to lessen the impact of a rapid cabin pressure loss on its occupants.

Such aircraft are equipped with a pressurized cabin. The pressure value of the cabin is often referred to as the cabin altitude. Cabin altitude is defined as the altitude corresponding to the pressurized atmosphere maintained within the cabin. This value is different than the aircraft altitude which is its actual physical altitude. All the altitude values correspond to the values as defined in the tables of conventional altitudes (or "pressure altitude").

Aviation regulations such as the Federal Aviation Regulations (FAR) require that all aircraft are equipped with an oxygen back up system to deliver in emergency situations a breathable gas, also called respiratory gas, to all passengers and crew members, or respiratory gas consumers. The gas shall be supplied e.g. an emergency oxygen or breathing mask, in case of such events as a cabin depressurization accident or smoke in the cockpit.

The emergency system responds to a suddenly occurring pressure drop in the pressurized cabin. In the event of a depressurization, the cabin altitude tends to converge towards the aircraft altitude value. The emergency mask or breathing apparatus is provided to deliver in such situations an oxygen enriched breathable gas or 100% oxygen to the wearer.

The breathing apparatus is supplied with additional gas delivered by pressurized oxygen cylinders, chemical generators, or On-Board Oxygen Generator System (OBOGS) or more generally any sources of oxygen. Known breathing apparatus may generally comprise a mask and a regulator for regulating the supply in breathable gas.

In a known breathing apparatus, the regulator is capable of administrating the required respiratory gas volume according to the wearer's demand. The control is thus function of his/her respiratory demand which may be determined by the depression consecutive to the inhalation, by the volume or flowrate of the inhaled gas, by the change in thoracic cage volume, or any suitable data representative of the wearer's demand. The known regulators deliver a respiratory gas for which the oxygen enrichment must always be greater than the minimum regulatory and physiologically required enrichment that depends upon the aircraft cabin altitude. An example of the FAR requirement is shown in FIG. 3.

For an oxygen consumer facing a sudden depressurization, a rapid donning of the mask is essential. The physiological consequences of a sudden loss of the oxygen supplied to the cabin are presented in FIG. 1. Results in FIG. 1 are given for an aircraft flying at 39,000 ft (corresponding atmospheric pressure $P_B$=197 hPa), and the cabin of which is pressurized at 8,000 ft ($P_B$=753 hPa, which is a commonly used cabin pressure value for cruising aircraft). At 8,000 ft, for a normal consumer, the oxygen partial pressure in the alveoli $P_AO_2$ is close to 96 hPa, and in the venous blood $P_VO_2$ is close to 40 hPa. The partial pressure of carbon dioxide in the alveoli $P_ACO_2$ is close to 49 hPa. The gas composition in the pulmonary alveoli is as follows, taking into account the water vapor partial pressure in the alveoli $P_AH_2O$ and nitrogen partial pressure in the alveoli $P_AN_2$.

TABLE 1.1 gas composition in the pulmonary alveoli at $P_B$ = 753 hPa

| | | |
|---|---|---|
| $P_ACO_2$ | 49 hPa | 6.5% |
| $P_AH_2O$ | 63 hPa | 8.4% |
| $P_AO_2$ | 96 hPa | 12.7% |
| $P_AN_2$ | 545 hPa | 72.4% |
| $P_B$ | 753 hPa | 100.0% |

The results lead to $P_AO_2/P_AN_2$=0.176. One may see that $P_AO_2 > P_VO_2$, which is essential, as explained here below.

With the hypothesis of a sudden depressurization of the cabin within 2 seconds, the pressure drops from 753 hPa to the outside pressure of 197 hPa, i.e. a 1 to 3.85 ratio. The partial pressure of each alveoli gas decreases in the same ratio, except for the water vapor and the carbon dioxide. $P_AH_2O$ is a physical unit which varies only as a function of the temperature, here the body temperature of 37° C., and therefore remains at 63 hPa. Regarding $P_ACO_2$, its value is determined through the balance between the amount of carbon dioxide coming from the venous blood and the amount released through breathing. Its value stabilizes around 25 to 30 hPa. The gas composition in the pulmonary alveoli becomes:

TABLE 1.2 gas composition in the pulmonary alveoli at $P_B$ = 197 hPa

| | | |
|---|---|---|
| $P_ACO_2$ | 30 hPa | 15.2% |
| $P_AH_2O$ | 63 hPa | 32.0% |
| $P_AO_2$ | 16 hPa | 8.31% |
| $P_AN_2$ | 88 hPa | 44.7% |
| $P_B$ | 197 hPa | 100.0% |

Table 1.2 shows that the oxygen partial pressure in the alveoli $P_AO_2$ decreases 6 fold, to a value lower than $P_VO_2$ (40 hPa). For $P_AO_2$ lower than $P_VO_2$, a blood totally unsaturated in oxygen flows out of the lungs. Only $P_AO_2$ variations are plotted on FIG. 1. With the oxygen mask in place within approximately 5 seconds of the decompression, pure oxygen is fed to the wearer, and $P_AO_2$ increases up to 80 hPa after plummeting below $P_VO_2$. In the mean time, $N_2$ is expelled from the lungs, from 50% less after 15-20 seconds, up to 90% less after about a minute.

One can see from FIG. 1 that for 10 to 15 seconds, $P_AO_2$ is below $P_VO_2$. Within 5 seconds of decompression, an $O_2$ unsaturated blood reaches the brain cells and central nervous system, and can cause a loss of consciousness, as the most oxygen sensitive brain cells cease to function.

If the crew member does not put on the mask urgently, he/she faces dangerous consequences. After 3 minutes with no oxygen, irreversible neurological lesions are imparted on the nervous system, which can lead to death. Furthermore, even with a preventive wearing of the mask, one can see from the here above calculations and FIG. 1 that with a mask set to supply a breathable gas with a roughly 21% oxygen content (as seen from FIG. 3 with a cabin altitude of 8,000 ft), the wearer's blood still becomes unsaturated in oxygen.

It would therefore be highly desirable to develop an aircraft oxygen delivery system that prevents the critical time when the blood becomes unsaturated in oxygen. Such a system would prevent any risk of loss of consciousness, and allow the crew member to be fully aware to react.

Accordingly, the present invention provides a system to deliver oxygen to crew members of an aircraft. The invention further provides a method of delivering oxygen to crew members.

The invention takes advantages of the applicant's observation that beyond a given cruising altitude for an aircraft, supplying an additional amount of oxygen to the consumer, —on top of the normal amount supplied (based on the cabin altitude), will result in a less severe collapse of $P_AO_2$ in the consumer's blood. This additional supply, hereafter called preoxygenation, prevents $P_AO_2$ to become lower than $P_VO_2$.

The breathable gas supplied to the mask is partly dependent upon the aircraft altitude in anticipation of the actual cabin pressure after a depressurization accident. Preoxygenation can be seen as an anticipation of the actual cabin conditions (cabin pressure) if a decompression accident were to occur at the aircraft cruising altitude.

Other features and advantages of this invention will further appear in the hereafter description when considered in connection to the accompanying drawings, wherein:

FIG. 1 illustrates a diagram showing the $P_AO_2$ variation in a passenger's blood after decompression of the cabin from 8,000 ft to 39,000 ft;

Figure 2:
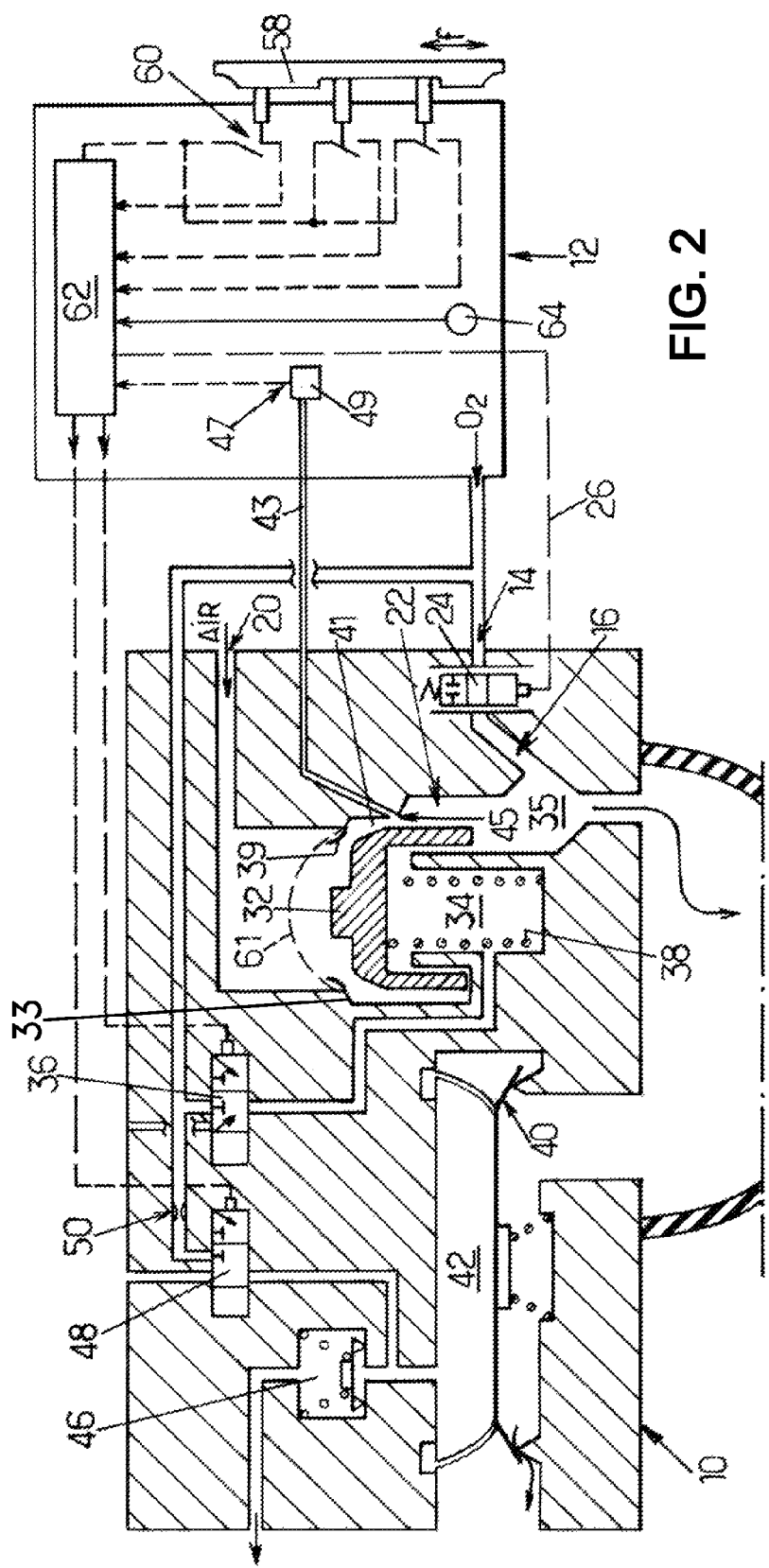
FIG. 2 illustrates an exemplary embodiment of an oxygen emergency system of a plane adapted to deliver preoxygenation in a first embodiment of the invention, and, FIG. 3 illustrates the minimal requirement amount of oxygen fed to a respiratory mask with a demand regulator, as a function of the cabin altitude.

Preoxygenation can be defined as the preventive breathing of additional oxygen enriched air, additional from the reference and/or minimal respiratory gas curves defined by the FAR for the given cabin altitude. Such reference curves will be detailed later on. In other words, the oxygen content of the respiratory gas fed to a crew member is increased from the minimal values (generally 21% at 5,000 ft to 8,000 ft) shown in FIG. 3. Preoxygenation allows to prevent the risk of hyperacute hypoxia following a fast decompression of 5 seconds or less.

Preoxygenation prior to a Rapid Decompression in less than 5 Seconds:

The minimal oxygen fraction $F_IO_2$ supplied to the mask that ensures a significant enough minimum value $P_AO_2$ is determined with the following hypotheses and calculations:
water vapor partial pressure in the alveoli $P_AH_2O$ is constant during decompression, and corresponds to the water vapor saturating pressure at 37° C., i.e. 63 hPa, partial pressure of carbon dioxide in the alveoli $P_ACO_2$ stabilizes rapidly after decompression around a value of 30 hPa, for a rapid decompression at an altitude of 35,000 ft or higher, $$-\frac{P_AN_2}{P_AO_2}$$

remains constant before, and right after decompression.
With (i) and (f) corresponding respectively to the initial and final conditions of the decompression, using Dalton law and $P_AO_2/P_AN_2$=constant lead to the following equations:

$$\frac{P_AO_2(i) + P_AN_2(i) + P_AH_2O + P_ACO_2(i)}{P_AO_2(f) + P_AN_2(f) + P_AH_2O + P_ACO_2(f)} = \frac{P_B(i)}{P_B(f)}$$

$$\frac{P_AN_2(i)}{P_AO_2(i)} = \frac{P_AN_2(f)}{P_AO_2(f)} = \frac{P_AN_2}{P_AO_2}$$

leading to:

$$P_AO_2(i) = \frac{\frac{P_B(i)}{P_B(f)}\left[P_AO_2(f)\left(1 + \frac{P_AN_2}{P_AO_2} + \frac{93}{P_AO_2(f)}\right)\right] - 63 - P_ACO_2(i)}{1 + \frac{P_AN_2}{P_AO_2}}$$

with $P_ACO_2(f)$ and $P_AH_2O$ replaced by their respective value of 30 and 63 hPa.

With the following complementary data:
a) minimum value of $P_AO_2$ at the end of decompression. Several hypotheses are possible:
  $P_AO_2$ remains greater than the oxygen partial pressure in the venous blood $P_VO_2$ (40 hPa as seen before for a cabin altitude between 5,000 and 8,000 ft), loss of consciousness is prevented,
  $P_AO_2$ remains greater than $P_{50}$, which is the oxygen partial pressure corresponding to $S_aO_2$ at 50%, i.e. 36 hPa, $S_aO_2$ being the arterial blood oxygen saturation. For a few seconds, this value of $P_AO_2$ is tolerable even though a rapid decrease of $S_aO_2$ may be disabling,
  the main factor influencing $P_AO_2$ minimum value is actually the time delay to put on the emergency mask. Assuming the emergency mask is installed within 5 seconds (maximum allowable time according to the FAR), the here above $P_AO_2$ value can be lowered even more to 30 hPa, which corresponds to a value of $S_aO_2$ of 40 to 45%, i.e. the threshold for immediate loss of consciousness.

The hereafter calculations will be based on the target value of either 30 or 40 hPa for $P_AO_2(f)$. Other target values may be envisaged depending on the chosen $P_AO_2$ threshold value.

b)

$$\frac{P_AN_2}{P_AO_2}$$

remains constant along the decompression of the cabin.
The calculations are carried out as follows:
1) target value of $P_AO_2(f)$ is set,
2) using $P_AN_2=P_B-P_AO_2-P_AH_2O-P_ACO_2$, $P_AN_2(f)$ is calculated after decompression,
3)

$$\frac{P_AN_2}{P_AO_2}$$

is calculated,
4) $P_AN_2(i)+P_AO_2(i)$ is calculated before decompression, as well as $P_AO_2(i)$ knowing $$\frac{P_AN_2}{P_AO_2},$$

5) $P_AO_2(i)$ is then transformed into a $F_IO_2$ value, which gives the percentage of additional oxygen when compared to the minimum oxygen content needed at the pressurized cabin altitude (5,000 to 8,000 ft), i.e. 21%, as seen for this range of cabin altitude in FIG. 3.

Calculations show that the cabin pressure has little influence on the percentage of additional oxygen, specifically between 5,000 to 8,000 ft. Therefore, the hereafter Table 2 may be determined wherein, with the conservative assumption that $P_AO_2=40$ hPa after decompression, the percentage of additional oxygen is given as a function of the aircraft altitude.

Table 2 further takes into account the fact that beyond a given altitude, e.g. 35,000 ft for small aircraft or 41,000 ft for large ones, crew members are to wear a breathing mask as a preventive measure, and such a mask delivers a positive pressure PPB after decompression. Feeding oxygen with overpressure PPB, or positive pressure, becomes compulsory beyond a second given altitude, e.g. 39,000 ft, in case of decompression to ensure a proper and efficient breathing.

TABLE 2 preoxygenation as a function of the aircraft altitude in case of 5 s or less decompression

| aircraft altitude (ft) | % additional $O_2$ | aircraft altitude (ft) | % additional $O_2$ |
| --- | --- | --- | --- |
| 25,000 | 0 | 36,000 | 20 |
| 30,000 | 7.0 | 37,000 | 23 |
| 31,000 | 9.0 | 38,000 | 27 |
| 32,000 | 10.5 | 39,000 | 31 |
| 33,000 | 12.5 | 41,000 | 35 |
| 34,000 | 15 | 43,000 | 40 |
| 35,000 | 17 | 45,000 | 46 |

The values of Table 2 ought to be read as follows:

Total percentage of oxygen fed to the crew member=percentage required at the cabin altitude (generally 21%)+percentage of additional $O_2$ (x%)  (1)

For example, at 45,000 ft, the total percentage of oxygen is 21+46=67%. The 5 second or less decompression figures constitute the reference case, or most unfavorable decompression scenario. For short decompression times (5 s. or less), without preoxygenation, and considering the nominal use of an emergency respiratory mask (with PPB), $P_AO_2$ reaches dramatic minimal values. With a preoxygenation profile of Table 2, i.e. as a function FREF ($Z_{aircraft}$), with $Z_{aircraft}$ the aircraft altitude, $P_AO_2$ decreases to 40 hPa, thus avoiding unsaturated blood leaving the lungs.

The 5 second or less decompression figures corresponding to a minimum $P_AO_2$ of 40 hPa does not take into account the physical characteristics of the aircraft. An aircraft manufacturer may guaranty longer decompression times, thus reducing the preoxygenation requirements. Indeed, with less severe aircraft pressure drop after a decompression accident, less preoxygenation is required to ensure a minimal $P_AO_2$ of 40 hPa. The faster the decompression time, the greater the need for anticipation—i.e. preoxygenation—of the accident.

For aircraft with a guaranteed long decompression time, e.g. greater than 20 seconds, no preoxygenation is needed as $P_AO_2$ does not reach the dramatic levels mentioned earlier. This corresponds to the most favorable decompression scenario.

Any decompression scenario will lead to a preoxygenation (function of the aircraft altitude) comprised between "no preoxygenation" and the conservative preoxygenation profile of Table 2. In other words, the preoxygenation function is defined according to the following equation:

$F_IO_2=21\%+FPREOX(Z_{aircraft})$  (2)

wherein $F_IO_2$=total percentage of $O_2$ in the respiratory gas supplied by the system according to the invention, $FPREOX(Z_{aircraft}) \leq FREF(Z_{aircraft})$, $FPREOX(Z_{aircraft})$ being a percentage function of the aircraft altitude, $Z_{aircraft}$ being the aircraft altitude, $FPREOX(Z_{aircraft})=0$ is a possibility provided the aircraft manufacturer guaranties a high enough decompression time.

These calculations allow to define the preoxygenation profile that the system according to the invention is to follow to feed additional oxygen to the respiratory gas consumers.

Such a system to deliver a respiratory gas to consumers of an aircraft generally comprises an oxygen source, supply lines to transport the oxygen to the passengers and crew-members, e.g. either to the cabin or to respiratory masks such as emergency masks for the passengers or crewmember masks. The system further comprises a mixing device provided on the supply lines to supply a respiratory gas corresponding to a mixture of ambient air and additional gas to the crew member mask. In the system according to the invention, the regulation means are further adapted to deliver additional gas to the mask at least partly as a function of the altitude of the aircraft.

The regulations are also adapted to regulate the additional gas content of the respiratory gas supplied by the mixing device at least partly as a function of the cabin altitude. This function is known from existing respiratory masks for crew members as it allows to adapt the oxygen content of the respiratory gas after a decompression accident based on the FAR. This regulation corresponds to FIG. 3. As the regulation is based on the cabin altitude, no anticipation is provided. This regulation is actually sufficient when a longer decompression time is ensured by the aircraft manufacturer.

In the system according to the invention, the regulation means are adapted to increase the additional gas content of the respiratory gas provided by the mixing means as a function of the cabin altitude defined by equation (2) mentioned here before.

In a preferred embodiment of the system according to the invention, the regulation means are further adapted to regulate the additional gas content as a function of the decompression time guaranteed by the aircraft manufacturer.

In an additional embodiment of the system according to the invention, as the decompression time guaranteed by the aircraft manufacturer may vary depending on the type of aircraft, the regulation means are configured to ensure any preoxygenation function corresponding to a decompression scenario comprised between the most favorable scenario (no preoxygenation or "preoxygenation neutralized") and the most unfavorable scenario (preoxygenation according to Table 2).

Thus the regulation means are adapted to regulate the additional gas content of the respiratory gas as defined in equation (2).

FIG. 2 illustrates an exemplary embodiment of the system according to the invention, and more specifically the demand regulator with its regulating means, as known from WO2006/005372.

The regulator comprises two portions, one portion 10 incorporated in a housing carried by a mask (not shown) and the other portion 12 carried by a box for storing the mask. The box may be conventional in general structure, being closed by doors and having the mask projecting therefrom. Opening the doors by extracting the mask causes an oxygen feed cock to be opened.

The portion carried by the mask is constituted by a housing comprising a plurality of assembled together parts having recesses and passages formed therein for defining a plurality of flow paths.

A first flow path connects an inlet 14 for oxygen to an outlet 16 leading to the mask. A second path connects an inlet 20 for dilution air to an outlet 22 leading to the mask. The flow rate of oxygen along the first path is controlled by an electrically-controlled cock. In the example shown, this cock is a proportional valve 24 under voltage control connecting the inlet 14 to the outlet 16 and powered by a conductor 26. It would also be possible to use an on/off type solenoid valve, controlled using pulse width modulation at a variable duty ratio.

A "demand" subassembly is interposed on the direct path for allowing dilution air to flow into the mask, said subassembly acting to conduct ambient air and to measure the instantaneous demanded flow rate or any other type of remotely controlled actuator.

In the example shown, the right section of the dilution air flow path is defined by an internal surface 33 of the housing, and the end edge of a piston 32 slidingly mounted in the housing. The piston is subjected to the pressure difference between ambient pressure and the pressure that exists inside a chamber 34. An additional electrically-controlled valve 36 (specifically a solenoid valve) serves to connect the chamber 34 either to the atmosphere or else to the pressurized oxygen feed. The electrically-controlled valve 36 thus serves to switch from normal mode with dilution to a mode in which pure oxygen is supplied (so-called "100%" mode). When the chamber 34 is connected to the atmosphere, a spring 38 holds the piston 32 on seat 39 but allows the piston 32 to separate from the seat 39, when a user inhales an intake, in order to let air pass through the air flow path, in the mixing chamber 35 where air is mixed with oxygen. When the chamber 34 is connected to the oxygen supply the piston 32 presses against the seat 39, thereby preventing air from passing. The piston 32 can also be used as the moving member of a servo-controlled regulator valve. In general, regulators are designed to make it possible not only to perform normal operation with dilution, but also emergency positions thanks to selector 58.

The air flow path comprises a Venturi constriction 41, between the piston 32 and the housing of the portion 10. The Venturi constriction 41 has, for example, a section of 0.57 mm². This section has been determined according to a particular mask model and can be changed for other mask models. A capillary duct 43 having an inlet port 45 is connected to the Venturi constriction 41 and an outlet port 47 is connected to a pressure sensor 49. The pressure sensor 49 measures the air pressure in the Venturi constriction 41 through the capillary duct 43. The signal from the pressure sensor 49 is transmitted to an electronic circuit 62.

The housing of the portion 10 also defines a breathe-out path including a breathe-cut valve 40. The shutter element of the valve 40 shown is of a type that is in widespread use at present for performing the two functions of acting both as a valve for piloting admission and as an exhaust valve. In the embodiment shown, it acts solely as a breathe-out valve while making it possible for the inside of the mask to be maintained at a pressure that is higher than the pressure of the surrounding atmosphere by increasing the pressure that exists in a chamber 42 defined by the valve 40 to a pressure higher than ambient pressure.

In a first state, an electrically-controlled valve 48 (specifically a solenoid valve) connects the chamber 42 in the atmosphere, in which case breathing occurs as soon as the pressure in the mask exceeds ambient pressure. In a second state, the valve 48 connects the chamber 42 to the pressurized oxygen feed via a flowrate-limiting constriction 50. Under such circumstances, the pressure inside the chamber 42 takes up a value which is determined by relief valve 46 having a rate closure spring.

The housing for the portion 10 may further carry means enabling a pneumatic harness of the mask to be inflated and deflated. These means are of conventional structure and consequently they are not shown nor described.

In the position shown in FIG. 2, the selector 58 closes a normal mode switch 60. As shown by arrow "f," the selector 58 can be moved and placed in three positions. In its other two positions, it closes respective switches for a 100% $O_2$ mode and for emergency mode ($O_2$ with over pressure).

The switches are connected to the electronic circuit 62 which operates, as a function of the selected operating mode, in response to the cabin altitude as indicated by a sensor 64, to the aircraft altitude and to the instantaneous flow rate being demanded as indicated by the pressure sensor 49 to determine the rate at which to supply oxygen to the wearer of the mask. The circuit card provides appropriate electrical signals to the first electrically-controlled valve 24.

In normal mode, the pressure sensor 49 supplies the instantaneous demand pressure to the outlet 22 from the air flow path, filtered through the filter 61, into the mask (see continuous line in FIG. 2). The electronic circuit 62 receives this signal together with information concerning the altitude of the cabin that needs to be taken into account and that comes from the sensor 64. The electronic circuit further receives a signal corresponding to the aircraft altitude (e.g. signal taken from the aircraft bus system).

The electronic circuit 62 then determines the quantity or flow rate of oxygen or breathable gas to be supplied according to equation (2) as defined before.

While the regulation according to the cabin altitude functions somewhat instantly to a cabin pressure drop, the regulation according to the aircraft altitude is used in anticipation of any sudden cabin pressure drop.

An example of the minimal reference curve according to the FAR is shown in FIG. 3. The regulation according to the cabin altitude may follow such a curve (as in known regulators).

The known reference curves are drawn up on the basis of regulations that specify the concentration of the breathing mixture required for the pilot as a function of cabin altitude.

With a pressurized cabin at e.g. 8,000 ft, the known demand regulators deliver a respiratory gas comprising a minimum value of 21% of oxygen, which corresponds to $F_iO_2$ of equation (2). The electronic card of the known demand regulators defines the target value as a function of the cabin pressure (or cabin altitude) and the chosen reference curve. Upon the occurrence of a depressurization accident, the cabin pressure drops suddenly to a value equal or close to the aircraft altitude. In a known regulator, the oxygen content of the respiratory gas is modified according to the chosen reference curve.

In the system according to the invention, beyond a given altitude of the aircraft, and in anticipation of a depressurization accident, the electronic card further adjusts the oxygen content supplied by the here above demand regulator depending on the aircraft actual altitude. More precisely, the electronic card follows equation (2).

The here before system is illustrated for a respiratory mask with a demand regulator. One may envisaged to apply the teachings of this invention to the cabin of an aircraft, provided with additional oxygen as a function of the aircraft altitude, so that preoxygenation is available to crew members not wearing the respiratory mask and passengers during a flight.

The invention claimed is:

1. A system to deliver a respiratory gas in a normally pressurized cabin of an aircraft to passengers and one or more crew members, said system comprising:
   equipment for pressurizing the cabin at a cabin altitude of between approximately 5000-8000 feet for passengers and crew members;
   a respiratory mask in the cabin for the crew member,
   an ambient air inlet for admission of ambient air into said system,
   a source of additional gas,
   supply lines to transport said additional gas to said respiratory mask,
   mixing chamber provided on said supply lines for feeding said respiratory mask with said respiratory gas corresponding to a mixture of said additional gas and said ambient air, and
   a regulation system configured to regulate the additional gas content of said respiratory gas while at the cabin altitude at least partly as a function of the aircraft altitude according to the equation:

$$F_IO_2 = 21\% + FPREOX(Z_{aircraft})$$

wherein:
   $F_IO_2$=total percentage of additional gas in said respiratory gas, and
   $Z_{aircraft}$=aircraft altitude,
   such that, when $FPREOX(Z_{aircraft}) > 0$, $FPREOX(Z_{aircraft})$ varies incrementally as $Z_{aircraft}$ varies incrementally.

2. A system according to claim 1, further comprising a demand regulator provided upstream the respiratory mask, said demand regulator comprising the regulation system and the ambient air inlet, said demand regulator providing the respiratory gas to said respiratory mask.

3. A system to deliver a respiratory gas in a normally pressurized cabin of an aircraft to passengers and one or more crew members, said system comprising:
   equipment for pressurizing the cabin at a normal cabin altitude of between approximately 5000-8000 feet for passengers and crew members;
   a respiratory mask in the cabin for the crew member,
   an ambient air inlet for admission of ambient air into said system,
   a source of additional gas,
   supply lines to transport said additional gas to said respiratory mask,
   mixing chamber provided on said supply lines for feeding said respiratory mask with said respiratory gas corresponding to a mixture of said additional gas and said ambient air, and
   a regulation system configured to regulate the additional gas content of said respiratory gas as a non-binary function of aircraft altitude while at the normal cabin altitude.

4. A system to deliver a respiratory gas in a normally pressurized cabin of an aircraft to passengers and one or more crew members, said system comprising:
   equipment for pressurizing the cabin at a cabin altitude for passengers and crew members;
   a respiratory mask in the cabin for the crew member,
   an ambient air inlet for admission of ambient air into said system,
   a source of additional gas,
   supply lines to transport said additional gas to said respiratory mask,
   mixing chamber provided on said supply lines for feeding said respiratory mask with said respiratory gas corresponding to a mixture of said additional gas and said ambient air, and
   a regulation system configured to regulate the additional gas content of said respiratory gas as functions of the aircraft altitude and a fixed, guaranteed decompression time of the aircraft.

5. A system to deliver a respiratory gas in a normally pressurized cabin of an aircraft to passengers and one or more crew members, said system comprising:
   equipment for pressurizing the cabin at a cabin altitude for passengers and crew members;
   a respiratory mask in the cabin for the crew member,
   an ambient air inlet for admission of ambient air into said system,
   a source of additional gas,
   supply lines to transport said additional gas to said respiratory mask,
   mixing chamber provided on said supply lines for feeding said respiratory mask with said respiratory gas corresponding to a mixture of said additional gas and said ambient air,
   a regulation system to regulate the additional gas content of said respiratory gas at least partly as a function of the aircraft altitude,
   wherein the regulation system is configured to regulate the additional gas content of the respiratory gas as a function of aircraft altitude according to the equation:

$$F_IO_2 = 21\% + FPREOX(Z_{aircraft})$$

wherein:
   $F_IO_2$=total percentage of additional gas in said respiratory gas,
   $Z_{aircraft}$=aircraft altitude, and
   $FPREOX(Z_{aircraft}) \leq FREF(Z_{aircraft})$, with $FPREOX(Z_{aircraft})$ a percentage function of $Z_{aircraft}$,
   $FREF(Z_{aircraft})$ being a percentage function of $Z_{aircraft}$ and given by the following table:

| $Z_{aircraft}$(ft) | $FREF(Z_{aircraft})$ | $Z_{aircraft}$(ft) | $FREF(Z_{aircraft})$ |
   |---|---|---|---|
   | 25,000 | 0  | 36,000 | 20 |
   | 30,000 | 7  | 37,000 | 23 |
   | 31,000 | 9  | 38,000 | 27 |
   | 32,000 | 11 | 39,000 | 31 |
   | 33,000 | 13 | 41,000 | 35 |
   | 34,000 | 15 | 43,000 | 40 |
   | 35,000 | 17 | 45,000 | 46. |

6. A method of using a system to deliver a respiratory gas to a crew member in a normally pressurized cabin of an aircraft, said system comprising:
   a respiratory mask in the cabin for the crew member,
   an ambient air inlet for admission of ambient air into said system,
   an additional gas source,
   supply lines to transport said additional gas to said respiratory mask,
   mixing chamber provided on said supply lines for feeding said respiratory mask with said respiratory gas corresponding to a mixture of said additional gas and said ambient air,
   said method comprising
   pressurizing the cabin to a cabin altitude lower than the aircraft altitude for passengers, delivering said additional gas to said respiratory mask when worn by a crew member at least as a function of the aircraft altitude, wherein delivering the additional gas is according to the following equation:

$$F_IO_2 = 21\% + FPREOX(Z_{aircraft})$$

wherein:

$F_IO_2$ = total percentage of additional gas in said respiratory gas, $Z_{aircraft}$ = aircraft altitude, and $FPREOX(Z_{aircraft}) \leq FREF(Z_{aircraft})$, with $FPREOX(Z_{aircraft})$ a percentage function of $Z_{aircraft}$, $FREF(Z_{aircraft})$ being a percentage function of $Z_{aircraft}$ and given by the following table:

| $Z_{aircraft}$(ft) | $FREF(Z_{aircraft})$ | $Z_{aircraft}$(ft) | $FREF(Z_{aircraft})$ |
|---|---|---|---|
| 25,000 | 0  | 36,000 | 20 |
| 30,000 | 7  | 37,000 | 23 |
| 31,000 | 9  | 38,000 | 27 |
| 32,000 | 11 | 39,000 | 31 |
| 33,000 | 13 | 41,000 | 35 |
| 34,000 | 15 | 43,000 | 40 |
| 35,000 | 17 | 45,000 | 46. |

* * * * *